Oct. 21, 1969    H. VOGELSANG ET AL    3,473,575
THERMALLY INSULATED PIPE
Filed May 31, 1967

JOSEPH GOEPFERT
HERBERT VOGELSANG
        INVENTORS.

BY
        ATTORNEYS

United States Patent Office 3,473,575
Patented Oct. 21, 1969

3,473,575
THERMALLY INSULATED PIPE
Herbert Vogelsang, Hannover, and Joseph Goepfert, Hamburg, Germany, assignors to Kabel- und Metallwerke, Gutehoffnungshutte, Hannover, Postfach, Germany, a corporation of Germany
Filed May 31, 1967, Ser. No. 642,463
Claims priority, application Germany, June 1, 1966, H 59,560
Int. Cl. F16l 9/18, 11/12
U.S. Cl. 138—149                    17 Claims

ABSTRACT OF THE DISCLOSURE

A pipe for fluids constructed of two coaxial corrugated tubes with spacers and insulation in between.

---

Figure 1:
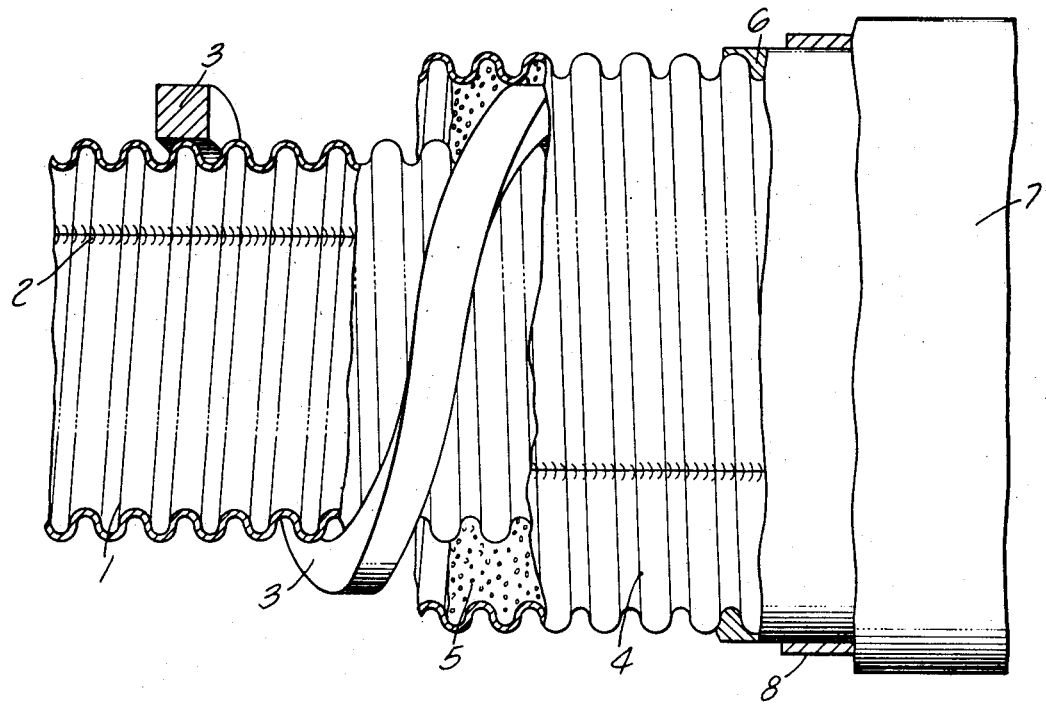

The present invention relates to a thermally insulated pipe. The object of the invention is to provide a pipe particularly adapted for use as an underground conduit means for fluids such as gases or liquid. Of particular interest is the utilization of the pipe in systems in which the medium passing through the pipe has a rather high temperature such as, for example, hot water or steam in a central heating system.

For central heating, water is usually heated up to a desired temperature in a centrally located heating plant and conduits lead from this plant to the several locations such as individual buildings to be heated. The pipe systems needed for this purpose depend on the individual situations and vary, of course, from case to case. It is thus common to use steel pipes of relatively short length which are being installed in situ and wherever necessary. In this case, of course, it is necessary to interconnect the short pipes at the construction site, for example, by welding. In addition, the joints must be thermally insulated subsequently with great care and also, of course, at the construction site. The pipes usually vary in sizes from about 4 to 5 inches up to about 2 or 3 feet in diameter. For an extensive construction project the number of joints to be made in this manner may be quite high, each requiring great care as to thermal insulation. The pipes have to be placed underground so that channels for receiving the pipes have to be dug and have to be closed subsequently, for example, by cementing and/or by providing covers, etc. For reasons of insulation, the pipes must be installed at a particular minimum depth, which poses additional difficulties when the subsoil water level is rather high. Other problems arise from thermal expansions of the pipes and from the fact that, for example, the pipes are not being used during the summer months so that they are subject to the corroding effect of stagnating water, etc.

It is known to provide twin pipe systems with coaxially positioned tubes, for the conduction of low temperature liquids, such as liquified gases through the inner tube. Inner and outer tubes are kept apart by helical spacers, while the space between the tubes is evacuated. This, however, has the disadvantage that the vacuum will deteriorate with time and soon the medium free path of the residual gases which have evaporated from the pipes into the coaxial hollow space, will be comparable with the distance between the two tubes. Thus, pumps have to be provided to frequently or even continuously evacuate that interior space between the tubes in order to maintain the vacuum. A rather large pumping power is required because the helical spacer subdivides the spacing in between the two coaxial tubes into a hollow helix having a length which is considerably larger than the lengths of the pipes themselves.

A coaxial type pipe system wherein the space between the tubes is evacuated is not well suited for the conduction of a hot fluid. The fluid, when passing through the inner pipe, will boil out residual gases therefrom which will deteriorate the inter tube vacuum. Thus, the vacuum in between the two pipes has to be maintained continuously so that the overall expenditure is quite high.

It is an object of the present invention to provide a new tubing for a new pipe which obviates the deficiencies outlined above. It is also an object of the present invention to provide a new and improved, thermally insulated conduit or pipe system which can be used for fluid conduction underground as well as above ground and particularly for the conduction of fluids having a high temperature. The pipe, in accordance with the present invention, is provided by two coaxial tubes with helical, circular or bellows type corrugations. The tubes have different diameters and are spaced apart radially for a particular distance. The inner tube is the conduit proper; the cylindrical space in between the two tubes is provided with a thermally insulated material, while the outer pipe is provided with corrosion proofing and a mechanically protective layer or layers. The essential feature of the insulation is that inhibition of convective flow of air must result therefrom. Thus, the insulation may comprise porous, spongy or fibrous material or individual elements subdividing the space between the tubes into small chambers which do not communicate with each other by convective flow.

The pipe, in accordance with the invention, has the particular advantage that it can be manufactured at an indefinite length. A long string of such pipe can be wound on a drum and transported on the drum to the construction site. There the pipe is unwound and cut at the desired lengths so that jointless pipe strings can lead from the respective fluid sources to the destinations thereof, i.e., for example, from a heating plant to the several, possibly remotely, located buildings.

Channels for the pipe do not have to be very deep, nor specially lined, and may even be dispensed with entirely. The corrugations compensate for thermal expansion and contraction so that the pipe as a whole, does not change its length.

Figure 2:
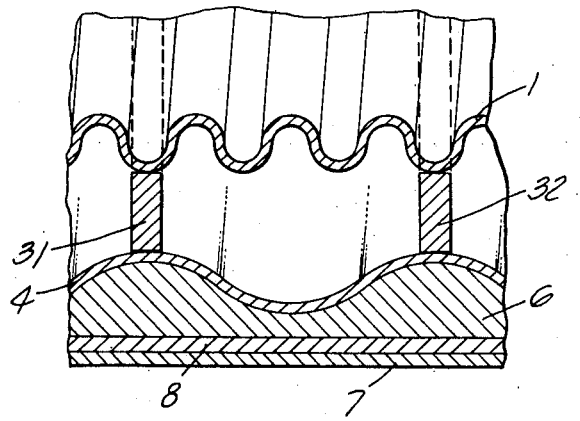

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGURE 1 illustrates a side view of a portion of a pipe in accordance with the present invention with staggered exposure of the interior; and FIGURE 2 illustrates a modification of the structure shown in FIGURE 1.

Proceeding now to the detailed description of the drawings in FIGURE 1 thereof there is shown a first embodiment of the present invention. There is first an inner tube 1 made preferably of copper and the interior of tube 1 is destined as conduit for a flowing medium, the transmission of which has to be thermally insulated from the environment. The tube 1 has a corrugated configuration and the resulting ribs are coaxial with the axis of the pipe. Originally the tube 1 has been formed from a sheet of copper which has been butt welded to form the seam 2. In the alternative, the pipe could be formed by helically winding an elongated, tape-like copper sheet and welding the sides thereof to form a closeable helix-type seam. The corrugations are being formed subsequently.

The exterior of the tube 1 is circumscribed by a helical support member 3 which has a rather large pitch in comparison with the axial repetition rate of the corrugations so that the support member 3 engages metallic surface portions only in very discrete, isolated areas and not, for example, along the entire crest of a single rib of the tube 1. Thus, the areas of contact and of possible thermal conduction from tube 1 into the member 3 are kept at a minimum by this pitch selection. The helical member 3, as mounted on the tube 1, is in turn received by the outer tube 4, having in general the same characteristics as the pipe 1 and having been made preferably in a similar manner, except that, of course, the diameter of tube 4 is larger. The tube 4 can, but does not have to, be made from the same material as the tube 1. For example, the tube 4 can be made of steel. The outwardly directed circumference of the helical member 3 engages the inwardly directed rib portions of the corrugations of tube 4 also at isolated areas thereof because again the pitch of the helix is larger than the repetition rate of the corrugations in axial direction. The principal function of helical member 3 is the positioning of the tubes 1 and 4 relative to each other, so that they maintain their coaxial relationship and the distance between the tubes is retained at a uniform value to ensure perpetuity of the insulated relationship between the tubes without creation of hot spots.

The helical member 3, of course, does not fill completely the cylindrical channel space defined between the tubes 1 and 4. This space is filled with a thermally insulating layer 5, for example, a foam material such as polyurethane. Since polyurethane foam is rather hard, the helical member 3 can be dispensed with entirely and the material 5 then serves also as a spacer. Alternatively one can use glass wool as insulating material. Since air, when stagnating, is actually a very good thermal insulator, it is not necessary to fill the entire space between the tubes 1 and 4 with such insulating material. The essential feature is a provision to inhibit any convective flow of air between the tubes. However, it may be easier from a manufacturing standpoint just to fill the entire interior space between the tubes 1 and 4 with this foam material whereby a great degree of accuracy during the filling is not needed; in case some air pockets remain here or there, the quality of the thermal insulation does not suffer in the least. The insulating material can be provided in form of strips or webs to be wound around the tube 1 in a helical manner and, for example, in the spaces left by the helical member 3.

The outer wall of the pipe 4 is preferably covered with a protective layer 6 to inhibit corrosion. Layer 6 may consist of or include a highly viscous material, for example, of the bituminous type. Tube 4 with layer 6 is received by a sleeve or a hose 7 which may be made of polyvinylchloride, serving as a physical protection of the layer 6. A thin foil 8 made of polyterephthalacidicester may be provided as additional layer in between layer 6 and sleeve 7 in order to prevent migration and diffusion of chemicals such as softening agents or plastizers between the somewhat liquidous materials 6 and sleeve 7.

The pipe, in accordance with the present invention, has the particular advantage that it can be made as a continuous pipe string as it is flexible and, therefore, can be wound upon a drum. This not only facilitates the transportation but it also facilitates the placement of the pipe, as it simply can be unwound from the drum whenever to be positioned. Subsequently the required amount of piping is simply cut from the string. Whenever the pipe is to be put in place no additional thermal insulation is required. The pipe can then be installed; it is merely required to connect the two ends of that piece of pipe respectively to the source and user of the fluid which is to be passed through the pipe. These connections can well be made, for example, in the interior of buildings, i.e., in an environment different from and more favorable than the environment through which the main portions of the pipe are to run. No intermediate joints are required so that the insulating quality can be strictly controlled by the manufacturing process of the pipe and does not depend on any additional insulation to be installed at the construction site.

The corrugations purposely extend around the axis of the tubes. The ridges can be circular, or a single ridge may helically wind itself around the axis so that the tubes have the configuration of a large threaded bolt. During temperature changes in the the environment, the material of which the pipe system is formed undergoes changes in its length. However, due to the corrugated structure of either tube, and due to the helical configuration of spacer member 3, the thermal expansion of any of these elements is taken up by the elements themselves and is not effective as a change in the axial length of the pipe as a whole and very little or no expansion or contraction force will result. The pipe connections at the respective ends will thus not tend to loosen.

The corrosion protection as provided by bituminous layer 6 serves particularly as protection against water if surrounding the pipe. This concerns the outer pipe directly as well as the thermal insulating layer 5, which will not be subjected to any in-flow of water, so that its thermal insulation capability will not be detrimentally modified by such external water.

It should be mentioned that, of course, inner tube 1 has to be made of a material and of a wall thickness which offers sufficient strength to take up the pressure of the medium passing therethrough. This, in turn, actually eliminates any further strength requirement for the outer tube 4 as ultimately this tube 4 serves only as a mechanical protecting and supporting means. However, due to the somewhat elastic construction of the corrugated inner tube 1, some pressure may be transmitted through the member 3 onto the outer tube 4. Thus, it is of advantage and may actually facilitate construction to provide the pipe 4 with similar properties with regard to thickness and rigidity of tube 1.

The material to be used for tube 1 is, as stated, preferably copper, because copper exhibits very little corrosion. In addition, it should be pointed out that the corrugated structure, particularly of the interior of the pipe 1, induces turbulent flow and inhibits laminar flow which is of advantage with regard to precipitation. The material of the outer pipe is determined primarily by the conditions of the environment. If, as is contemplated, the pipe is usually to be used as an underground fluid conductor, one can also use copper or steel, provided the steel is provided with the corrosion protection, as mentioned.

A modified embodiment is shown in FIGURE 2 where the cylindrical space between the two tubes 1 and 4 is subdivided into many individual chambers by means of spacer rings 31, 32, etc., made of thermally insulating material and essentially inhibiting convective flow of air in that cylindrical space. These rings each are radially cut into two similar portions for easy mounting. FIGURE 2 illustrates further that the pitch of the corrugations of inner and outer tube can be different.

The invention is not limited to the embodiments described above but all changes and modifications thereof not constituting departures from the spirit and scope of the invention may be made therein.

What is claimed is:

1. Thermally insulated flexible pipe for conducting hot fluids, comprising:

a first, inner tube and a second, outer tube, coaxially disposed to the inner tube, each tube having a corrugated wall having annular or helical ridges and grooves, there being an air-filled cylindrical space in between the inner and outer tubes;

thermally insulating means in the cylindrical space partially occupying the air-filled space throughout and distributed for causing stagnation of air in the cylindrical space so as to inhibit convective flow of air therein; and a protective layer on the outer tube to essentially inhibit corrosion thereof and to provide portection against mechanically effective damaging influences.

2. A pipe as set forth in claim 1, the thermally insulating means comprising sheets of insulating material wound upon the inner tube.

3. A pipe as set forth in claim 1, the insulating means comprising a foam material.

4. A pipe as set forth in claim 3, the foam material being polyurethane.

5. A pipe as set forth in claim 1, the insulating means being glass wool.

6. A pipe as set forth in claim 1, the insulating means comprising individual spacer elements subdividing the cylindrical space into individual air chambers, leaving essentially no communication in between adjacent chambers.

7. A pipe as set forth in claim 1, at least one of the tubes being made of copper.

8. A pipe as set forth in claim 1, the inner tube being made of copper, the outer tube being made of steel.

9. A pipe as set forth in claim 1, the protective layer including a bituminous layer and a flexible sleeve above the bituminous layer.

10. A pipe as set forth in claim 9, the sleeve being made of polyvinyl chloride.

11. A pipe as set forth in claim 9, there being a foil interposed between the bituminous layer and the sleeve.

12. A thermally insulated pipe as set forth in claim 1, comprising:
a helical support and spacing member of rectangular cross section in the cylindrical space engaging inner and outer tubes at discrete points and defining a helical air space therein, the pitch of the helical support member being larger than the repetition rate of the corrugations of the tubes in axial directions, so that the helical member engages any ridge at an angle relative to the peripheral extension of the ridge.

13. A pipe as set forth in claim 12, the insulating material comprising a porous sheet wound around the inner pipe and in the helical space.

14. Thermally insulated flexible pipe for conducting hot fluids, comprising:
a first, inner tube and a second outer tube coaxially disposed to the inner tube, each tube having corrugated wall having annular ridges and grooves, the axial ridge to ridge distance of the outer tube being larger than the ridge to ridge distance of the inner tube, there being an air-filled space between outer and inner tube;
thermally insulating means distributed in the space between the tubes to cause the air to stagnate in the space so as to inhibit convective flow of air therein;
a corrosion proofing layer on the outer tube; and
a sleeve on the layer to provide protection against mechanically effective damaging influences.

15. Thermally insulated flexible pipe for conducting hot fluids, comprising:
a first, inner tube and a second outer tube coaxially disposed to the inner tube, each tube having corrugated wall defined by annular or helical ridges and grooves, there being a cylindrical space between the tubes;
hard polyurethane foam in the cylindrical space having air-filled noncommunicating pockets to inhibit convective flow of air radially, as well as axially, in the cylindrical space; and
a protective layer on the outer tube to essentially inhibit corrosion thereof and to provide protection against mechanically effective damaging influences.

16. Thermally insulated pipe comprising:
a first, inner tube and a second, outer tube, coaxially disposed to the inner tube, each tube having a corrugated wall having annular ridges and grooves, there being a cylindrical space in between the inner and outer tubes;
thermally insulating means in the cylindrical space and having configuration to inhibit convective flow of air in the cylindrical space;
a bituminous layer on the outer tube to essentially inhibit corrosion thereof, a polyvinylchloride sleeve over the layer to provide protection against mechanically effective damaging influences; and
a foil between the layer and the sleeve.

17. Thermally insulated flexible pipe for conducting hot fluids, comprising:
a first, inner tube and a second outer tube, coaxially disposed to the inner tube each tube having corrugated wall defined by annular or helical ridges and grooves, there being a cylindrical space between the tubes; and
thermally insulating material distributed in the cylindrical space, partially occupying the space and being distributed throughout the space for causing stagnation of air throughout the space so as to inhibit convective flow therein.

References Cited

UNITED STATES PATENTS

| | | | |
|---|---|---|---|
| 2,937,662 | 5/1960 | Green | 138—149 X |
| 3,332,446 | 7/1967 | Mann | 138—148 X |

LOUIS K. RIMRODT, Primary Examiner

U.S. Cl. X.R.

138—114